E. R. HILL.
FLUSH TANK VALVE.
APPLICATION FILED JUNE 13, 1918.

1,294,908.

Patented Feb. 18, 1919.
2 SHEETS—SHEET 1.

WITNESSES
Edw. Thorpe
Geo. L. Beeler

INVENTOR
E. R. Hill
BY
ATTORNEYS

E. R. HILL.
FLUSH TANK VALVE.
APPLICATION FILED JUNE 13, 1918.
1,294,908.
Patented Feb. 18, 1919.
2 SHEETS—SHEET 2.
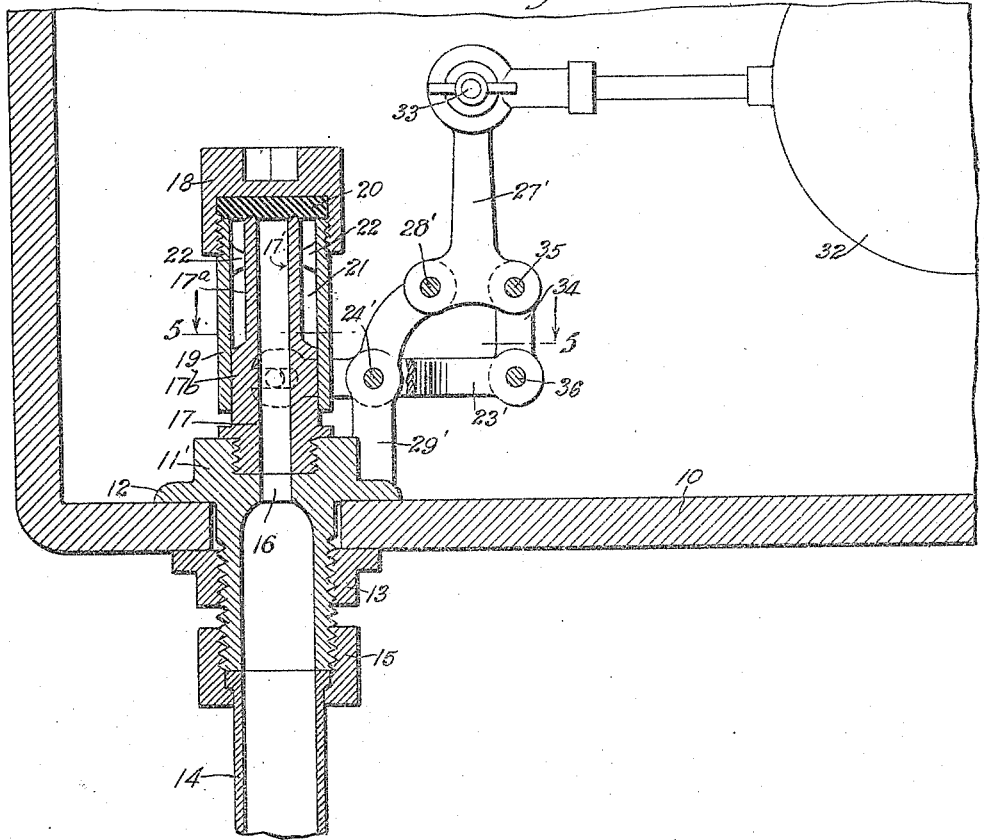
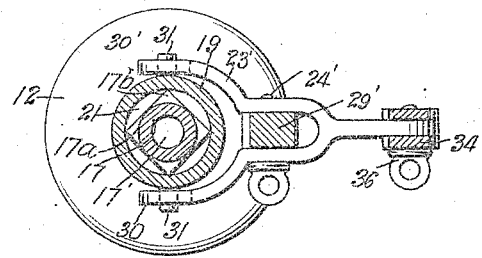
WITNESSES
Edw. Thorpe
Geo. R. Beelen
INVENTOR
E. R. Hill
BY
ATTORNEYS

UNITED STATES PATENT OFFICE.

ELIJAH R. HILL, OF NEW ALBANY, MISSISSIPPI.

FLUSH-TANK VALVE.

1,294,908.   Specification of Letters Patent.   Patented Feb. 18, 1919.

Application filed June 13, 1918. Serial No. 239,800.

*To all whom it may concern:*

Be it known that I, ELIJAH R. HILL, a citizen of the United States, and a resident of New Albany, in the county of Union and State of Mississippi, have invented a new and Improved Flush-Tank Valve, of which the following is a full, clear, and exact description.

This invention relates to flush tank apparatus and has particular reference to the automatic valves for controlling the inlet supply pipes of such devices, this invention constituting an improvement on the structure covered by Letters Patent of the United States, No. 1,257,231, issued to me on the 19th day of February, 1918.

Among the objects of the present invention is to simplify and improve the construction along the lines of efficiency, reliability and compactness, and with reference to the present improvements attention will be given to the accompanying drawings in which Figure 1 is a sectional view of a flush tank and spud connection indicating the automatic valve in side elevation.

Fig. 4 is a vertical central section showing a slight modification from the form shown on sheet one; and Fig. 5 is a horizontal section on the line 5—5 of Fig. 4.

Figure 1:
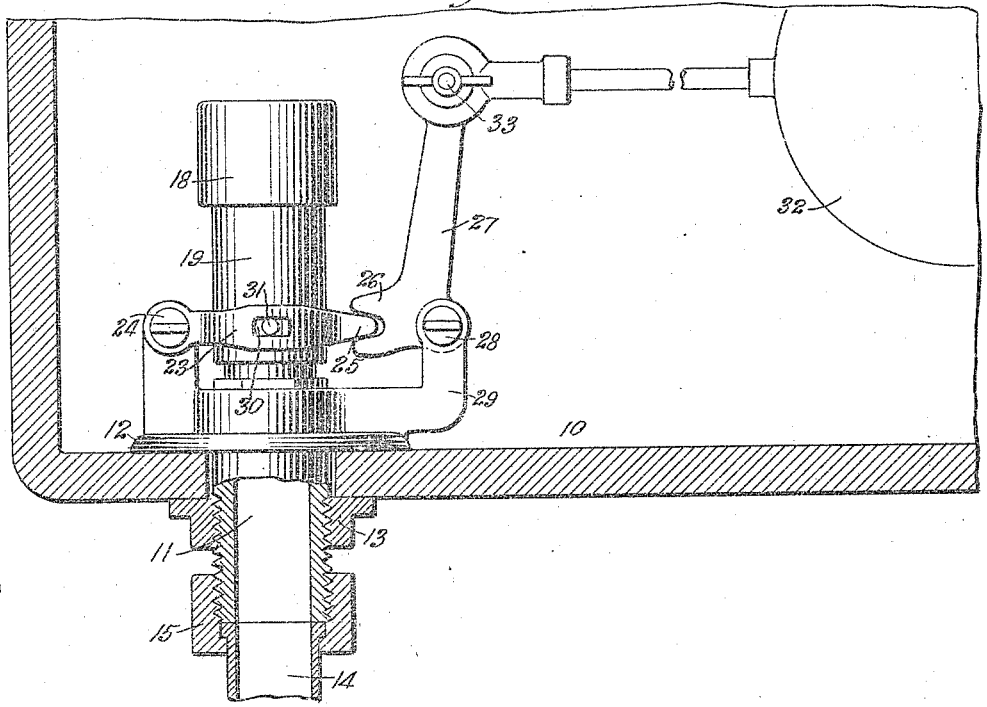

Through the bottom of the tank 10 projects a spud 11 having a flange 12 coöperating with the upper surface of the tank bottom and having a threaded lower end upon which is screwed a locking nut 13 against the lower surface of said bottom whereby the spud is locked in fixed position with a fluid tight connection with the tank. The water supply pipe 14 is connected in any suitable manner with the lower end of the spud as by means of a coupling nut 15.

Figure 3:
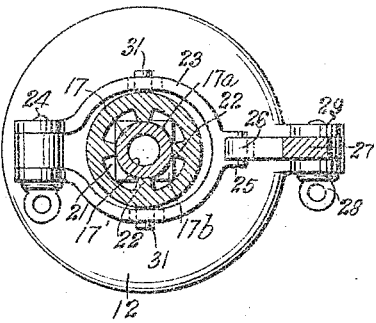
Fig. 3 is a horizontal sectional detail on the line 3—3 of Fig. 2.

Secured in or to the upper portion of the spud and at its center in communication with the port 16 thereof is a nozzle 17 having a bore 17'. The upper end of this nozzle is cylindrical as shown at $17^a$, while the lower or base portion thereof $17^b$ is square in cross section, as shown best in Fig. 3. The portion $17^a$ is of the same diameter as the smallest diameter of the base portion but since it constitutes a reduction from the square portion it follows that the corners of the base portion project radially materially beyond the outer surface of the upper part of the nozzle.

The valve proper comprises a head 18 preferably screw threaded upon the upper end of a sleeve 19 and carrying within it a gasket or washer 20 coöperating with the upper end of the nozzle 17 as a valve seat. The sleeve, like the nozzle, is of straight and hence relatively simple and cheap construction. The sleeve is in the form of a hollow cylinder the interior diameter of which is substantially equal to the largest diameter of the square portion $17^b$ of the nozzle but having a loose slidable fit therewith. There is, therefore, provided ample space 21 between the nozzle and the wall of the sleeve for the inflow of water. The upper end of the sleeve is preferably spaced and guided by means of a plurality of lugs 22 formed on one of the parts and coöperating with the adjacent wall of the other part, the lugs being shown in this instance as being formed upon the inner wall of the sleeve and coöperating with the cylindrical upper portion $17^a$ of the nozzle. In addition to the action of the lugs it will be noted that the corners of the lower portion of the nozzle have a similar guiding action in coöperation with the inner surface of the lower end of the sleeve.

23 indicates an elliptical yoke pivoted at 24 on one side of the nozzle and valve, the opposite end 25 of the yoke being embraced by the fork 26 of a bell crank lever 27 pivoted at 28 on the upper end of a pedestal 29 carried by or formed as an integral part of the spud 11. The yoke 23 loosely surrounds the sleeve 19 and is shown provided with oppositely arranged slots 30 into which project a pair of lugs 31 formed on opposite sides of the sleeve. A float ball 32 adjustably connected at 33 with the upper end of the bell crank 27 acts when buoyed upward by the water to automatically seat the valve and stop the inflow in the well known manner, the floating device being movable around the fixed pivot 28 causing through the short arm of the bell crank a powerful seating action on the yoke 23 which in turn acts through the lugs 31 to carry the valve downward. The parts thus far described are of a very simple construction well adapted for safe and reliable operation notwithstanding the fact that being normally submerged in water are subjected to rust, corrosion or deposition thereon of sediment or the like that is likely to interfere with the operation of such devices in the usual practice.

Figure 2:
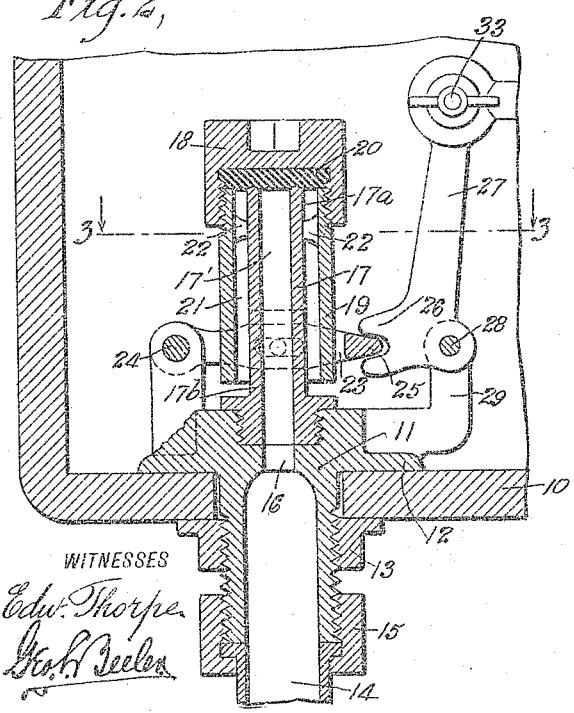
Fig. 2 is a vertical sectional view through the center of the inlet valve.

In Figs. 4 and 5 the spud 11' is fitted to the tank and provided with an inlet pipe connection similar to the features shown in Figs. 1 and 2, but in this modification a single pedestal 29' carried by the spud affords fixed pivots for both the bell crank 27' and the yoke 23', the respective pivots being indicated at 28' and 24'. The bell crank is of a double nature and is provided with a link 34 pivoted at 35 to the bell crank and at 36 to the inner end of the yoke. The yoke in this instance acts as a lever of the first class, the inner end of which is depressed by the float ball when the water is discharged from the tank, whereby the outer end of the yoke is lifted thereby lifting the valve which is indicated as of the same construction as fully described in connection with the first set of figures including the nozzle member. The yoke 23' in this modified form instead of passing around the sleeve 19 reaches only to the sides where it is provided with slotted ends 30'. While the valve structure in each form of the invention is adapted to coöperate with the nozzle or valve seat irrespective of any particular extent of rotation that may be imparted to the nozzle while being fixed to the spud, the lugs 31 coöperating with the slots of the yoke in either case will insure proper coöperation between the valve and the valve actuating means.

I claim:

In a flush tank valve, the combination of a spud having a standard carried by one side thereof, a bell crank pivoted to the standard, a float ball connected to the bell crank, a valve seat nozzle extending upward from the spud, the base portion of the nozzle being polygonal while the upper portion thereof is cylindrical, the diameter of the upper portion being the same as the smallest diameter of the base portion, a valve fitted upon and slidable up and down along the nozzle, said valve comprising a hollow cylindrical sleeve of uniform cross section, a head fixed to the upper end of the sleeve and a packing member carried within the head and coöperating directly with the valve seat, and means coöperating with the valve and actuated by the bell crank on the fall of the water level in the tank to open the valve.

ELIJAH R. HILL.

Copies of this patent may be obtained for five cents each, by addressing the "Commissioner of Patents, Washington, D. C."